(12) United States Patent
McLeod

(10) Patent No.: US 7,281,846 B2
(45) Date of Patent: Oct. 16, 2007

(54) INTEGRATED RESISTANCE CANCELLATION IN TEMPERATURE MEASUREMENT SYSTEMS

(75) Inventor: Scott C. McLeod, Oro Valley, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 0 days.

(21) Appl. No.: 10/924,176

(22) Filed: Aug. 23, 2004

(65) Prior Publication Data

US 2006/0039445 A1 Feb. 23, 2006

(51) Int. Cl.
*G01K 7/01* (2006.01)
(52) U.S. Cl. .............. 374/178; 327/513; 374/172
(58) Field of Classification Search ............ 374/163, 374/183, 178; 327/512, 513, 109, 336
See application file for complete search history.

(56) References Cited

U.S. PATENT DOCUMENTS

| | | | |
|---|---|---|---|
| 3,672,215 A | | 6/1972 | Stout et al. |
| 3,679,992 A | | 7/1972 | Yerman |
| 4,228,684 A | | 10/1980 | Templin |
| 5,195,827 A | * | 3/1993 | Audy et al. ............ 374/172 |
| 5,419,637 A | | 5/1995 | Frye et al. |
| 5,614,902 A | * | 3/1997 | Hopkins ................ 341/118 |
| 5,706,354 A | * | 1/1998 | Stroehlein ............. 381/94.1 |
| 5,982,221 A | | 11/1999 | Tuthill |
| 6,008,685 A | * | 12/1999 | Kunst .................... 327/512 |
| 6,097,239 A | | 8/2000 | Miranda, Jr. et al. |
| 6,169,442 B1 | | 1/2001 | Meehan et al. |
| 6,554,469 B1 | | 4/2003 | Thomson et al. |
| 6,554,470 B2 | | 4/2003 | Zhang et al. |
| 6,679,628 B2 | * | 1/2004 | Breinlinger ........... 374/178 |

(Continued)

FOREIGN PATENT DOCUMENTS

DE 003637520 11/1986

(Continued)

OTHER PUBLICATIONS

A switched-currect, switched capacitor temperature sensor in 0.6-microns CMOS. Author: Mike Tuthill. 1998.*

(Continued)

*Primary Examiner*—Gail Verbitsky
(74) *Attorney, Agent, or Firm*—Meyertons Hood Kivlin Kowert & Goetzel, P.C.; Jeffrey C. Hood

(57) ABSTRACT

A temperature measurement device may be implemented by coupling a PN-junction, which may be comprised in a diode, to an analog-to-digital converter (ADC) that comprises an integrator. Different currents may be successively applied to the diode, resulting in different $V_{BE}$ values across the diode. The $\Delta V_{BE}$ values thus obtained may be successively integrated. Appropriate values for the different currents may be determined based on a set of mathematical equations, each equation relating the $V_{BE}$ value to the temperature of the diode, the current applied to the diode and parasitic series resistance associated with the diode. When the current sources with the appropriate values are sequentially applied to the diode and the resulting diode voltage differences are integrated by the integrator comprised in the ADC, the error in the temperature measurement caused by series resistance is canceled in the ADC, and an accurate temperature reading of the diode is obtained from the output of the ADC.

31 Claims, 3 Drawing Sheets

U.S. PATENT DOCUMENTS

| | | | | |
|---|---|---|---|---|
| 6,736,540 | B1* | 5/2004 | Sheehan et al. | 374/183 |
| 6,956,517 | B1* | 10/2005 | Baker et al. | 341/155 |
| 6,962,436 | B1* | 11/2005 | Holloway et al. | 374/170 |
| 7,010,440 | B1 | 3/2006 | Lillis et al. | |
| 2005/0225468 | A1* | 10/2005 | Cosand | 341/155 |
| 2006/0029123 | A1* | 2/2006 | Johnson | 374/178 |
| 2006/0044047 | A1* | 3/2006 | Porter | 327/512 |

FOREIGN PATENT DOCUMENTS

| | | |
|---|---|---|
| EP | 000498799 | 5/1991 |
| EP | 000741860 | 12/1998 |
| GB | 002292221 | 2/1996 |

OTHER PUBLICATIONS

Chen et al., "Channel Temperature Measurement Using Pulse-Gate Method", IEEE Transactions on Microwave Theory and Techniques, vol. 47, No. 3, Mar. 1999.

Kaliyugavaradan et al., "Application of Reciprocal Time Generation Technique to Digital Temperature Measurement", IEEE Transactions on Instrumentation and Measurement, vol. 43, No. 1, Feb. 1994.

Hui et al., "Circuit Design and Implementation for Digital Temperature & Humidity Measurement and Control", ASIC, 2001. Proceedings, 4th International Conference on Oct. 23-25, 2001, pp. 502-505.

* cited by examiner

INTEGRATED RESISTANCE CANCELLATION IN TEMPERATURE MEASUREMENT SYSTEMS

BACKGROUND OF THE INVENTION

1. Field of the Invention

This invention relates generally to the field of integrated circuit design and, more particularly, to the design of temperature measurement devices.

2. Description of the Related Art

Many digital systems, especially those that include high-performance, high-speed circuits, are prone to operational variances due to temperature effects. Devices that monitor temperature and voltage are often included as part of such systems in order to maintain the integrity of the system components. Personal computers (PC), signal processors and high-speed graphics adapters, among others, typically benefit from such temperature monitoring circuits. For example, a central processor unit (CPU) that typically "runs hot" as its operating temperature reaches high levels may require a temperature sensor in the PC to insure that it doesn't malfunction or break due to thermal problems.

Often, integrated circuit (IC) solutions designed to measure temperature in a system will monitor the voltage across one or more PN-junctions, for example a diode or multiple diodes at different current densities to extract a temperature value. This method generally involves amplifying (or gaining up) a small voltage generated on the diode(s), and then subtracting voltage from the amplified temperature-dependent voltage in order to center the amplified (gained) value for conversion by an analog-to-digital converter (ADC). In other words, temperature-to-digital conversion for IC-based temperature measuring solutions is often accomplished by measuring a difference in voltage across the terminals of typically identical diodes when different current densities are forced through the PN junctions of the diodes. The resulting change ($\Delta V_{BE}$) in the base-emitter voltage ($V_{BE}$) between the diodes is generally proportional to temperature. (It should be noted that while $V_{BE}$ generally refers to a voltage across the base-emitter junction of a diode-connected transistor and not a voltage across a simple PN-junction diode, for the sake of simplicity, $V_{BE}$ is used herein to refer to the voltage developed across a PN-junction in general.) More specifically, a relationship between $V_{BE}$ and temperature is defined by the equation $$V_{BE} = \eta \frac{kT}{q} \ln \frac{I}{I_S} \quad (1)$$

where $\eta$ is the ideality factor of the PN junction, k is Boltzman's constant, q is the charge of a single electron, T represents absolute temperature, $I_s$ represents saturation current and I represents the collector current. A more efficient and precise method of obtaining $\Delta V_{BE}$ is to supply the PN junction of a single diode with two separate and different currents in a predetermined ratio. Consequently, $\Delta V_{BE}$ may be related to temperature by the equation $$\Delta V_{BE} = \eta \frac{kT}{q} \ln(N) \quad (2)$$

where N is a constant representing a preselected ratio of the two separate currents that are supplied to the PN junction of the diode.

A typical dynamic range of $\Delta V_{BE}$, however, is small relative to dynamic ranges that are typical of analog-to-digital converters (ADCs). That is, $\Delta V_{BE}$, which is used to measure the PN junction temperature, generally has a small dynamic range, for example on the order of around 60 mV in some systems. Therefore it is generally required to further process $\Delta V_{BE}$ in order to match the dynamic range of ADCs. Typically, in order to obtain the desired conversion values at various temperatures, $\Delta V_{BE}$ is multiplied by a large gain, and then centered to zero, which can be accomplished by subtracting a fixed voltage.

In general, implementations today perform the temperature signal processing (TSP) in a separate temperature sensor circuit that generates a sufficiently large voltage signal, which is fed into a separate ADC that may have been designed using a number of different topologies. Temperature-to-digital converters (TDC) of such implementations usually contain complex circuits with high power dissipation. The yield of these TDCs during the fabrication process may also be low as there are many components that need to be matched for a given process spread.

An example of a typical temperature measurement system, which includes an ADC, is illustrated in FIG. 1. A TSP circuit 100 is coupled to an ADC 130. TSP 100 may comprise current sources 104 and 106, where a current provided by 104 is an integer (N) multiple of a current provided by 106, a diode 102, an integration capacitor 126, an offset capacitor 122, a gain capacitor 124, and an operational amplifier (OP-AMP) 120, interconnected as illustrated in FIG. 1. P1 110 and P2 112 represent non-overlapping clocks that provide switching between two circuit configurations as shown. When P1 110 is closed, current source 104 powers TSP 100 and P2 112 is open. Similarly, when P2 112 is closed, current source 106 powers TSP 100 and P1 110 is open. Switching between current sources 104 and 106, different currents are forced through the junction of diode 102 resulting in a change in diode-junction-voltage ($\Delta V_{BE}$). Although omitted in FIG. 1, it should be understood that when either P1 110 or P2 112 is open, the respective uncoupled current source may be shunted to ground. In the circuit configuration shown, voltage sampling occurs when P1 110 is closed, and charge transfer takes place when P2 112 is closed. In other words, during operation, switching from a configuration of P1 110 closed and P2 112 open to a configuration of P1 110 open and P2 112 closed, results in $\Delta V_{BE}$ effectively "pumping" charge to gain capacitor 124, which in turn leads to integration capacitor 126 also receiving a charge. More specifically, opening P1 110 and closing P2 112 results in a value drop of diode-junction-voltage $V_{BE}$, expressed as $\Delta V_{BE}$. Consequently, $\Delta V_{BE}$ appears across the terminals of capacitor 126, in case capacitor 126 is equal in value to capacitor 124. If capacitor 124 is greater in value than capacitor 126, then $\Delta V_{BE}$ will be amplified, or "gained up", hence an amplified value Vtemp 131 will appear at the output of OP-AMP 120. Voffset 132 is subtracted through offset capacitor 122.

Voltage-temperature relationships characterizing TSP 100 may be described by the following equations:

Vtemp=$C_T/C_I$\*$\Delta V_{BE}(T)$−$C_O/C_I$\*Voffset, where $C_T/C_I$=(ADC dynamic range)/($\Delta V_{BE}(T\text{max})$−$\Delta V_{BE}(T\text{min})$), and Voffset=($C_T/C_I$\*$\Delta V_{BE}(T\text{max})$−(ADC dynamic range))
\*$C_I/C_O$.

Tmax and Tmin represent maximum and minimum diode temperatures, respectively. ADC dynamic range indicates a range of valid voltage values required for proper ADC operation.

One disadvantage of temperature measurement systems employing diodes—or generally PN-junctions—is that parasitic resistance in series with the diode(s) typically causes errors in the temperature measurement. Such parasitic resistance may be trace resistance or bulk resistance of the semiconductor material of the diode(s). Typically, in order to substantially eliminate series resistance errors during temperature measurements, multiple current sources are used and the $V_{BE}$ across the diode (PN-junction) is calculated for each current source being individually applied to the diode. Subsequently, the corresponding series resistance is calculated and the error resulting from the series resistance is subtracted from the temperature measurement to cancel the error out.

Other corresponding issues related to the prior art will become apparent to one skilled in the art after comparing such prior art with the present invention as described herein.

SUMMARY OF THE INVENTION

In one set of embodiments the invention comprises a system and method for performing temperature monitoring in a digital system by capturing a change in a PN-junction voltage ($\Delta V_{BE}$), which is proportional to a temperature of the PN-junction, and using an analog-to-digital converter (ADC) to perform on $\Delta V_{BE}$ all required signal conditioning functions, while also canceling errors due to series resistance.

In one embodiment, a PN-junction is coupled to a delta-sigma ADC, where the PN-junction is operable to develop a $\Delta V_{BE}$ signal at the input of the delta-sigma ADC. An integrator inherent in the delta-sigma ADC may be used to amplify $\Delta V_{BE}$, eliminating the need for a fixed gain amplifier. Amplification provided by the integrator may be used to match the voltage range of $\Delta V_{BE}$, which corresponds to the input dynamic range of the PN-junction over temperature, to the dynamic range of the delta-sigma ADC, which corresponds to the output voltage range of the delta-sigma ADC. The delta-sigma ADC may also perform subtracting an offset voltage from the amplified $\Delta V_{BE}$ to compensate for $\Delta V_{BE}$ being non-zero at the lowest operating temperature of the PN-junction, thus centering the voltage range of the amplified $\Delta V_{BE}$ to the dynamic range of the delta-sigma ADC. A determined number of current sources, each producing a different value current, may each be applied to the PN-junction in a specified sequence, one or more of the current sources applied more than once in the sequence, the sequence repeated a determined number of times, with the resulting $V_{BE}$ values across the PN-junction summed/subtracted by the integrator inherent in the delta-sigma ADC to form a final $\Delta V_{BE}$ value. A relationship between the values of the currents produced by each current source may be established such that an output of the ADC—after having repeated the specified sequence of applying the current sources to the diode the determined number of times—provides a numeric value corresponding to the temperature of the PN-junction, where the numeric value is substantially free of series resistance errors.

In one embodiment, three current sources are used in a sequence of applying current to the diode. The sequence may include the first current source being applied to the diode and the resulting value of the $V_{BE}$ developed in the diode being stored in the integrator comprised in the ADC.

As part of the sequence, the second current source may then be applied to the diode and the resulting $V_{BE}$ value may be subtracted from the previously stored $V_{BE}$ value in the integrator. As also part of the sequence, the first current source may again be applied to the diode, the resulting $V_{BE}$ value added to the previously obtained $V_{BE}$ value in the integrator. Finally in the sequence, the third current source may be applied to the diode and the resulting $V_{BE}$ value subtracted from the previously obtained $V_{BE}$ value in the integrator.

In one embodiment, the sequence is repeated 2048 times to obtain a final $\Delta V_{BE}$ value and a corresponding 11-bit temperature reading from the ADC, where the temperature reading is free of errors due to series resistance. In another embodiment, the sequence is performed once using an integrating sample and hold circuit in lieu of an integrator comprised within the ADC, with the resulting output being a $\Delta V_{BE}$ value free of errors due to series resistance. This $\Delta V_{BE}$ value may then be converted to a digital output by an ADC. In yet another embodiment, four current sources are used in a sequence where each one of the four current sources is applied to the diode once.

For each embodiment, a relationship between the respective values of the currents provided by the current sources may be derived from a set of mathematical equations, each equation relating the $V_{BE}$ value to: the temperature of the diode, the current applied to the diode and the parasitic series resistance.

Thus, various embodiments of the invention may provide a system and method for canceling series resistance errors during temperature monitoring performed by applying a $\Delta V_{BE}$ signal developed across a PN-junction, which may be a diode, directly to an ADC that performs all necessary signal-processing functions, including matching and centering the voltage range of $\Delta V_{BE}$ to the dynamic range of the ADC. Cancellation of the series resistance errors may be achieved by implementing the error cancellation process using the ADC, thus eliminating a need for post ADC conversion computations.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
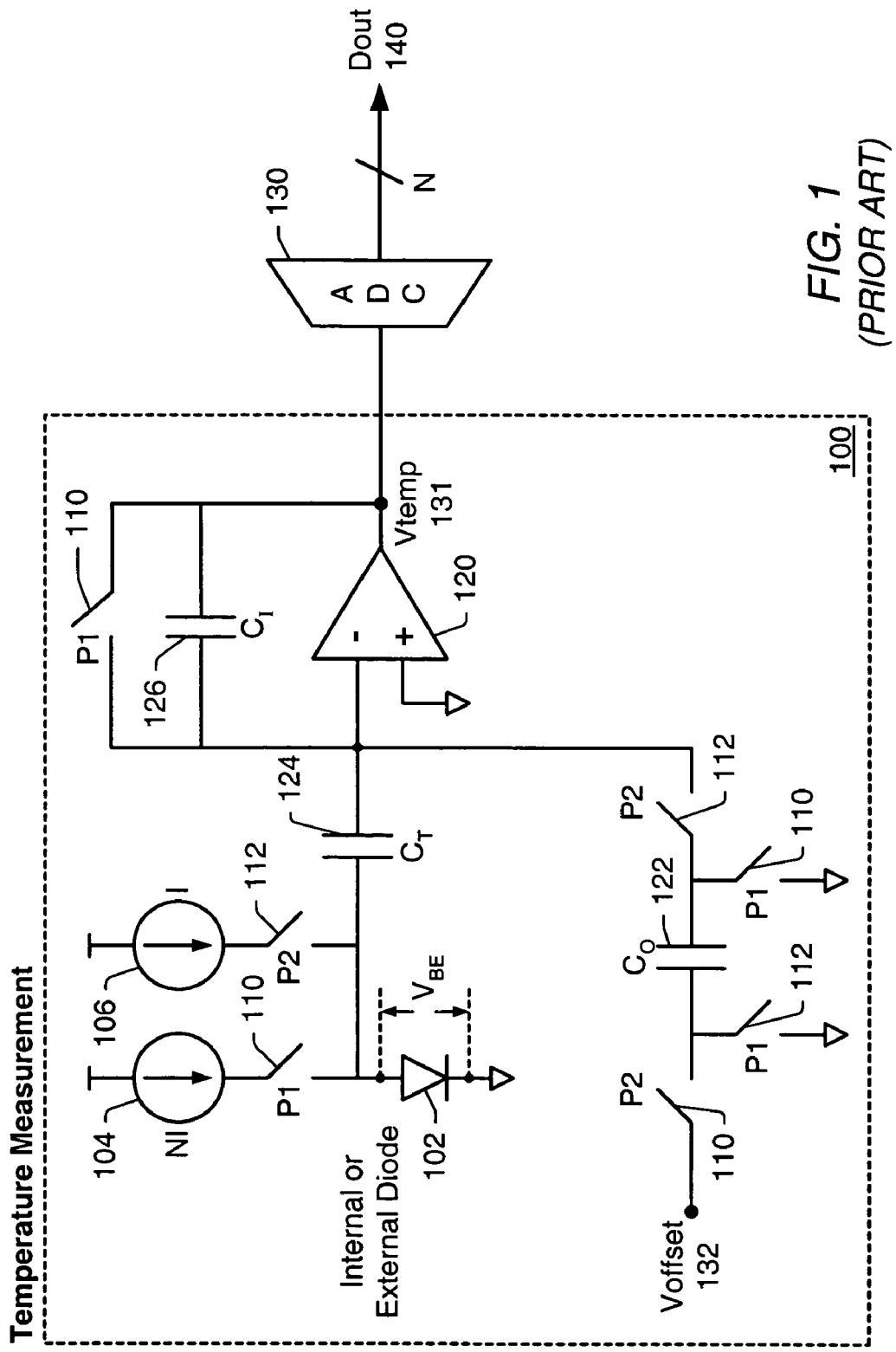
FIG. 1 illustrates one embodiment of a temperature measurement system that utilizes an ADC, in accordance with prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As used herein, the word "alternately" is meant to imply passing back and forth from one state, action, or place to another state, action, or place, respectively. For example, "alternately applying a first current source and a second current source" would mean applying the first current source, then applying the second current source, then applying the first current source, then applying the second current source, and so on.

A "diode-junction-voltage" ($V_{BE}$) refers to a voltage measured across the junction of a diode, or a difference in voltage between a voltage measured at the anode of the diode junction with respect to a common ground and a voltage measured at the cathode of the diode junction with respect to the common ground. A "change in diode-junction-voltage" ($\Delta V_{BE}$) refers to a change in diode-junction-voltage for a chosen diode, either in time or in different circuit configurations. For example, if in one circuit configuration $V_{BE}$=700 mV for a diode, and in a different circuit configuration $V_{BE}$=655 mV for the diode, then $\Delta V_{BE}$=45 mV for the diode when referencing to the two different circuit configurations. Similarly, for example, if at a time point t1 $V_{BE}$=650 mV for a diode, and at a time point t2 $V_{BE}$=702 mV for the diode, then $\Delta V_{BE}$=52 mV for the diode when referencing time points t1 and t2. "Storing" a $V_{BE}$ or $V_{BE}$ value in an integrator generally refers to developing a charge corresponding to the $V_{BE}$ value within the integrator. "Adding" and/or "subtracting" a $V_{BE}$ or $V_{BE}$ value in the integrator generally refers to increasing and/or decreasing the developed charge within the integrator, correspondingly to the $V_{BE}$ value.

A diode is used as one way of accessing a PN-junction across which voltage measurements to obtain $V_{BE}$ may be made. More generally, diode-junction may also mean PN-junction or NP-junction, which defines the physical attributes of the junction selected for obtaining temperature values through performing voltage measurements. Various embodiments of the circuit are described as utilizing a diode. However, in other embodiments, the operation performed by the diode may be achieved using other circuitry, such as a PN-junction (or NP-junction) present in devices other than a diode, for example bipolar junction transistors (BJTs). Therefore, the terms PN-junction, NP-junction, diode, and diode-junction are used interchangeably, and all respective terms associated therewith may be interpreted accordingly.

Figure 2:
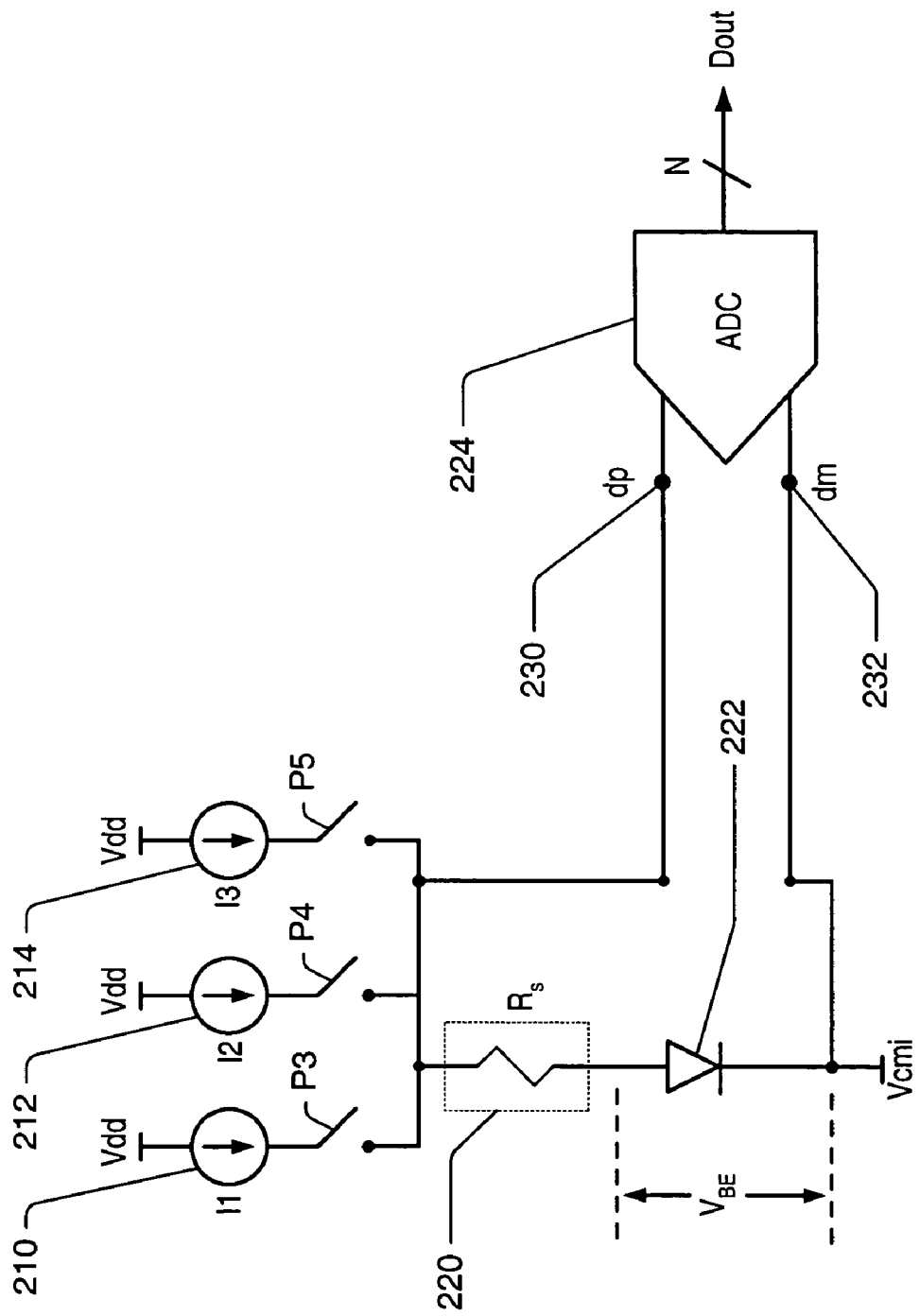
FIG. 2 illustrates a block diagram of one embodiment of a temperature sensor circuit implemented in accordance with the present invention.

FIG. 2 illustrates a block diagram of one embodiment of a temperature sensor circuit implemented in accordance with the present invention. In the embodiment shown, current sources I1 210, I2 212 and I3 214 can be individually coupled to diode 222 via respective switches P3, P4 and P5. Diode 222 may be coupled to the inputs of ADC 224, which may be a delta-sigma ADC, as shown. In general, embodiments of ADC 224 include an integrator. A parasitic series resistance that may be trace resistance or bulk resistance of the semiconductor material of diode 222 is shown as Rs 220, coupled between diode 222 and current sources 210, 212, and 214. For more detail on possible embodiments of ADC 224 and the coupling of diode 222 to ADC 224, please refer to U.S. patent application Ser. No. 10/624,394 titled "Temperature-to-Digital Converter" invented by Troy L. Stockstad and filed on Jul. 22, 2003, which is hereby incorporated by reference in its entirety as though fully and completely set forth herein.

The voltage between nodes dp 230 and dm 232 is also the $V_{BE}$ developed across diode 222 and $R_s$ 220 when one of current sources 210, 212, and 214 is applied. The respective voltages, across dp and dm, generated as a result of individually applying current sources 210, 212, and 214 may be expressed based on equation (1) as follows:

$$V_{BE1} = \eta \frac{kT}{q} * \ln\left(\frac{I_1}{I_S}\right) + I_1 * (R_S) \quad (3)$$

$$V_{BE2} = \eta \frac{kT}{q} * \ln\left(\frac{I_2}{I_S}\right) + I_2 * (R_S) \quad (4)$$

$$V_{BE3} = \eta \frac{kT}{q} * \ln\left(\frac{I_3}{I_S}\right) + I_3 * (R_S) \quad (5)$$

$I_s$ represents the saturation current of diode 222. $\eta$ is an ideality factor, which may have an assumed value of 1. $R_s$ represents $R_s$ 220 of FIG. 2. Difference voltage values between $V_{BE1}$, $V_{BE2}$ and $V_{BE3}$ may be expressed as:

$$\Delta V_{BEi} = V_{BE2} - V_{BE1} = \frac{kT}{q} * \ln\left(\frac{I_2}{I_1}\right) + R_S * (I_2 - I_1) \quad (6)$$

$$\Delta V_{BEii} = V_{BE3} - V_{BE2} = \frac{kT}{q} * \ln\left(\frac{I_3}{I_2}\right) + R_S * (I_3 - I_2). \quad (7)$$

Defining $\Delta V_{BE}$ as:

$$\Delta V_{BE} = \Delta V_{BEi} - \Delta V_{BEii} \quad (8)$$

the following relationship may be obtained:

$$\Delta V_{BE} = \frac{kT}{q} * \ln\left(\frac{I_2^2}{I_1 * I_3}\right) + R_S * (I_2 - I_1 - I_3 + I_2). \quad (9)$$

From equation (9) it follows that choosing $I_1$, $I_2$, and $I_3$ such that $$2*I_2 - I_1 - I_3 = 0, \quad (10)$$

any error due to series resistance $R_s$ 220 may be eliminated. By maximizing the first term in equation (10) and selecting appropriate values for $I_1$, $I_2$, and $I_3$ accordingly, the temperature T—corresponding to the temperature of diode 222 as it appears in equation (9) for example—may easily be obtained.

In one embodiment, by way of example, $I_1$ is selected to be 5 μA, $I_2$ is selected to be 85 μA, and $I_3$ is selected to be 165 μA. Thus, $\Delta V_{BE}$ will be related to temperature T as follows:

$$\Delta V_{BE} = \frac{kT}{q} * \ln\left(\frac{I_2^2}{I_1 * I_3}\right) = \frac{kT}{q} * \ln\left(\frac{85^2}{5 * 165}\right) = \frac{kT}{q} * \ln(8.\overline{75}). \quad (11)$$

The above calculation may be performed by a normal operation of ADC 224, which includes an integrator, when applying the proper sequence of currents to diode 222. Based on equation (10) and selected values for the current sources as reflected in equation (11), $I_1$, $I_2$, and $I_3$ may be applied to diode 222 in the following sequence, integrating the resulting $V_{BE}/\Delta V_{BE}$ for each current:

(A1) Apply $I_2$ (store $V_{BE2}$ in integrator)
(B1) Apply $I_3$ (subtract $V_{BE3}$ in integrator)
(C1) Apply $I_2$ (add $V_{BE2}$ in integrator)
(D1) Apply $I_1$ (subtract $V_{BE1}$ in integrator).

In order to obtain an 11-bit temperature value (reading) at the output Dout of FIG. 2, the above sequence may be repeated 2048 times. A temperature value thus obtained will be free of errors caused by parasitic series resistance. While in the embodiment shown the sequence is performed 2048 times, those skilled in the art will appreciate that the number of bits of resolution used for generating a numeric temperature reading may be selected as being higher and/or lower than 11 bits, with the sequence repeated a corresponding number of times for a given resolution.

Figure 3:
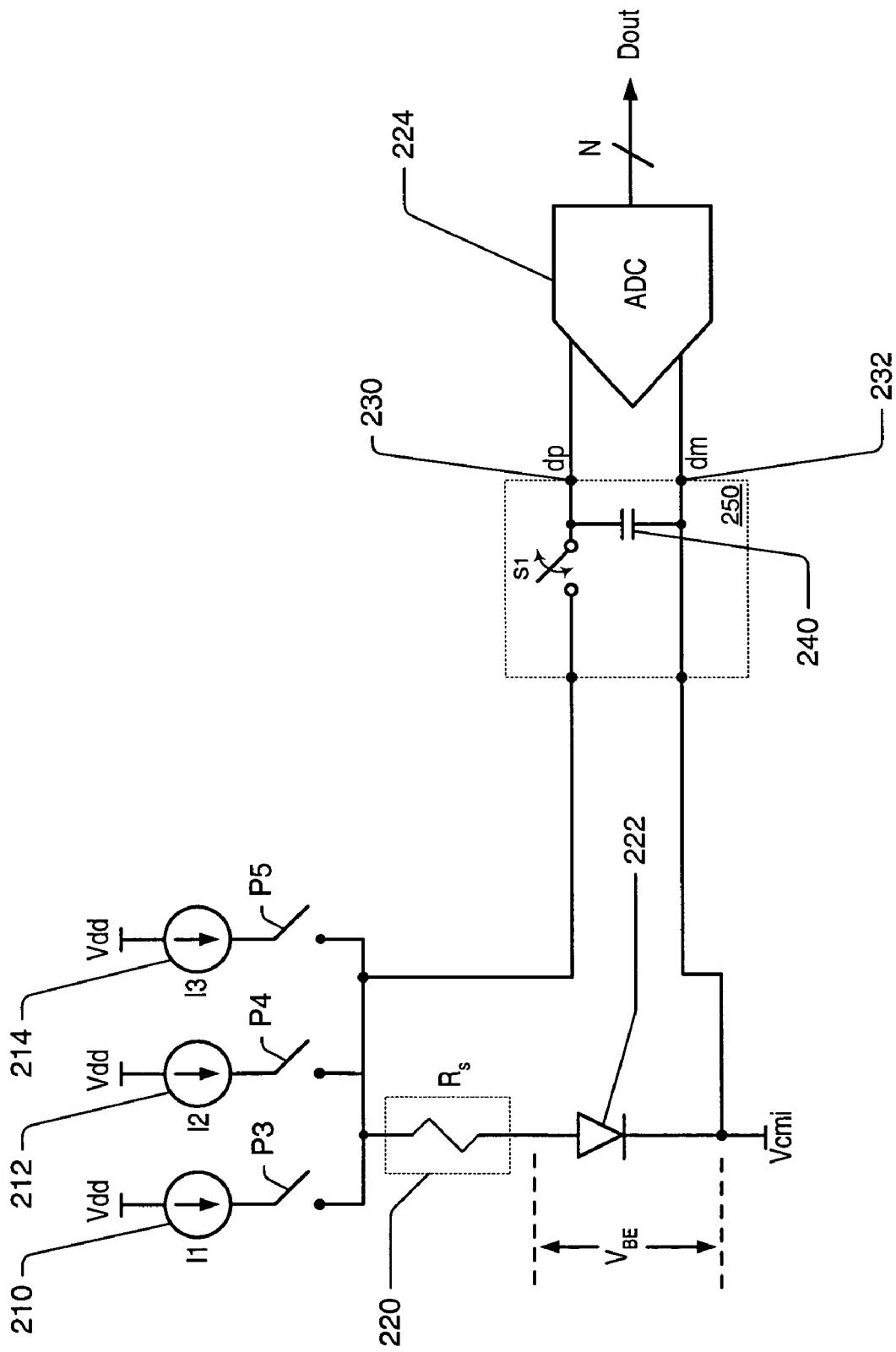
FIG. 3 illustrates a block diagram of a second embodiment of a temperature sensor circuit implemented in accordance with the present invention.

FIG. 3 illustrates an alternate embodiment of a temperature monitoring system in which an integrating sample-and-hold circuit (ISHC) 250 is coupled between diode 222 and ADC 224 as shown. In this embodiment ADC 224 may or may not include an integrator, as the sequence (A1)-(B1)-(C1)-(D1) is performed once, using ISHC 250 in lieu of an integrator comprised within the ADC, with the resulting output across dp 230 and dm 232 being a $\Delta V_{BE}$ value free of errors due to series resistance. This $\Delta V_{BE}$ value may then be converted using ADC 224 to produce a digital value.

In one set of embodiments, four current sources may be used instead of three. A fourth current source $I_4$ may be coupled to diode 222 using a respective switch in a manner similar to current sources $I_1$, $I_2$, and $I_3$. In case of four currents, the equation for $\Delta V_{BEii}$ may be re-written as:

$$\Delta V_{BEii} = V_{BE4} - V_{BE3} = \frac{kT}{q} * \ln\left(\frac{I_4}{I_3}\right) + R_S * (I_4 - I_3). \quad (12)$$

Following, $\Delta V_{BE}$ may be expressed as:

$$\Delta V_{BE} = \frac{kT}{q} * \ln\left(\frac{I_2 * I_3}{I_1 * I_4}\right) + R_S * (I_2 - I_1 - I_4 + I_3). \quad (13)$$

Again, by selecting the values of $I_1$, $I_2$, $I_3$, and $I_4$ such that $(I_2-I_1-I_4+I_3)=0$, the error term resulting from $R_s$ may be eliminated. Furthermore, in order to facilitate an easily obtainable temperature reading, the term $(I_2*I_3)/(I_1*I_4)$ may be maximized. Thus, by way of example, the value of $I_1$ may be set to 5 µA, $I_2$ may be set to 85 µA, $I_3$ may be set to 90 µA, and $I_4$ may be set to 170 µA, resulting in:

$$\Delta V_{BE} = \frac{kT}{q} * \ln(9). \quad (14)$$

The current sources may then be applied according to the following sequence:

(A2) Apply $I_3$ (store $V_{BE3}$ in integrator)
(B2) Apply $I_4$ (subtract $V_{BE4}$ in integrator)
(C2) Apply $I_2$ (add $V_{BE2}$ in integrator)
(D2) Apply $I_1$ (subtract $V_{BE1}$ in integrator).

In order to obtain an 11-bit temperature value at the output Dout of FIG. 2, the above sequence may be repeated 2048 times, similar to embodiments employing three current sources. Those skilled in the art will again appreciate that the number of bits of resolution used for generating a numeric temperature reading may be selected higher and/or lower than 11 bits, with the sequence repeated a corresponding number of times for a given resolution.

Thus, various embodiments of the systems and methods described above may facilitate the design of an accurate, less complex and less area-intensive temperature monitoring system with a digital output and with a reduced number of capacitor components and amplifiers. Such a temperature monitoring system may be implemented without recourse to voltage conditioning circuitry, such as amplifiers and reference voltage offsets, present outside the ADC used in the temperature monitoring system. Furthermore, potential temperature measurement errors due to parasitic series resistance may be cancelled by utilizing the integrating function inherent in the ADC used in implementing the temperature monitoring system. Thus, no post ADC conversion calculations/mathematical operations may be necessary to derive a final temperature free of the effects of parasitic series resistance.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A temperature monitoring system comprising:
    an analog-to-digital converter (ADC);
    a semiconductor device coupled to the ADC, wherein the semiconductor device has a substantially defined generally non-linear input-output characteristic that varies with temperature and is subject to effects of parasitic resistance; and
    a plurality of input devices operable to provide a sequence of input signals to the semiconductor device, wherein each input signal of the sequence of input signals is generated by one of the plurality of input devices;
        wherein the semiconductor device is operable to generate a sequence of output signals and provide the sequence of output signals to the ADC, wherein each output signal of the sequence of output signals is generated in response to a respective input signal of the sequence of input signals; and
    wherein the ADC is operable to produce a numeric value from the sequence of output signals, the numeric value corresponding to a temperature of the semiconductor device;
    wherein the plurality of input devices is operable to substantially eliminate an error component from the numeric value by providing a specific sequence of input signals to the semiconductor device, wherein the error component is caused by the effects of parasitic resistance.

2. The system of claim 1, wherein the semiconductor device comprises a PN-junction.

3. The system of claim 2, wherein the output signal is a base-emitter voltage developed across the PN-junction.

4. The system of claim 2, wherein the PN-junction is comprised in a diode.

5. The system of claim 2, wherein the PN-junction is comprised in a bipolar junction transistor (BJT).

6. The system of claim 1, wherein the plurality of input devices is a plurality of current sources, and the input signals are input currents.

7. The system of claim 1, wherein the plurality of input devices comprises three or more current sources and the input signals comprise input currents.

8. The system of claim 1, wherein the ADC is one of:
a pipeline ADC;
a cyclic ADC;
a delta-sigma ADC;
a successive approximation ADC; and
an integrating ADC.

9. The system of claim 1, wherein the ADC comprises an integrating sample-and-hold circuit.

10. A method for monitoring temperature, the method comprising:
determining a specific sequence of input signals from a plurality of available input signals, wherein each one of the specific sequence of input signals has a respective value, resulting in a sequence of values corresponding to the sequence of input signals, wherein a combination of the sequence of values adds up to zero;
applying the specific sequence of input signals to a device, the device having a substantially defined generally non-linear input-output characteristic that varies with temperature and is subject to effects of parasitic resistance, the device producing a sequence of output signals in response to the specific sequence of input signals, wherein each output signal of the sequence of output signals corresponds to a respective input signal of the specific sequence of input signals;
developing a compounded signal by combining each subsequent output signal of the sequence of output signals; and
generating a numeric value corresponding to the compounded signal, the numeric value further corresponding to a temperature of the device;
wherein in performing said determining the specific sequence of input signals, an error component is substantially eliminated from the numeric value during said developing the compounded signal, wherein the error component is caused by the effects of parasitic resistance.

11. The method of claim 10, wherein the device comprises a PN-junction.

12. The method of claim 11, wherein the device is one of:
a diode; and
a BJT.

13. The method of claim 12, wherein each input signal of the specific sequence of input signals is an input current, and each output signal of the sequence of output signals is a base-emitter voltage of the PN-junction.

14. The method of claim 13, wherein said combining each subsequent output signal comprises integrating each subsequent output signal.

15. The method of claim 14, wherein said integrating is performed by an integrating sample and hold circuit.

16. The method of claim 15, wherein the integrating sample-and-hold circuit is comprised in an ADC.

17. The method of claim 16, wherein the ADC is one of:
a delta-sigma ADC;
a cyclic ADC;
a pipeline ADC;
a successive approximation ADC; and
an integrating ADC.

18. The method of claim 16, wherein said generating and outputting the numeric value is performed by the ADC.

19. The method of claim 13, wherein each input current is generated by one of a specified number of current sources.

20. A method for monitoring temperature, the method comprising:
generating a plurality of input currents, each one of the plurality of input currents having a different value;
applying selected ones of the plurality of input currents in a specified sequence to a PN-junction, wherein a combination of the selected ones of the plurality of input currents adds up to zero, said applying resulting in a sequence of base-emitter voltages of the PN-junction, wherein each base-emitter voltage of the sequence of base-emitter voltages corresponds to a respective selected one of the plurality of input currents being applied to the PN-junction, and wherein one or more of the selected ones of the plurality of input currents are operable to be applied to the PN-junction more than once in the specified sequence;
developing a voltage difference signal by integrating each base-emitter voltage of the sequence of base-emitter voltages; and
generating a numeric value from the voltage difference signal, the numeric value corresponding to a temperature of the PN-junction, wherein in performing said applying selected ones of the plurality of input currents in the specified sequence, an error component is substantially eliminated from the numeric value during said developing the voltage difference signal, wherein the error component is caused by effects of parasitic resistance in series with the PN-junction.

21. The method of claim 20, wherein each input current of the plurality of input currents is generated by a respective current source.

22. The method of claim 20, wherein the plurality of input currents comprises at least three input currents.

23. The method of claim 20, wherein a value relationship between the selected ones of the plurality of input currents is determined based on a set of mathematical equations, each equation of the set of mathematical equations relating a respective base-emitter voltage of the sequence of base-emitter voltages to:
the respective selected one of the plurality of input currents applied to the PN-junction resulting in the respective base-emitter voltage;
a temperature of the PN-junction corresponding to the respective selected one of the plurality of input currents applied to the PN-junction; and
a value of the parasitic resistance in series with the PN-junction.

24. A temperature monitoring system comprising:
an analog-to-digital converter (ADC);
an integrating sample-and-hold circuit coupled to the ADC;
a semiconductor device coupled to the integrating sample-and-hold circuit, wherein the semiconductor device has a substantially defined generally non-linear input-output characteristic that varies with temperature and is subject to effects of parasitic resistance; and
a plurality of input devices operable to provide a sequence of input signals to the semiconductor device, wherein each one of the sequence of input signals has a respective value, resulting in a sequence of values corresponding to the sequence of input signals, wherein each one of the plurality of input signals is generated by a corresponding one of the plurality of input devices, and wherein a combination of the sequence of values adds up to zero;

wherein the semiconductor device is operable to generate a sequence of output signals and provide the sequence of output signals to the integrating sample-and-hold circuit, wherein each output signal of the sequence of output signals is generated in response to a respective input signal of the specified sequence of input signals;

wherein the integrating sample-and-hold circuit is operable to produce a compounded output signal from the sequence of output signals, wherein the compounded output signal corresponds to a temperature of the semiconductor device, wherein the plurality of input devices is operable to substantially eliminate an error component from the compounded output signal by providing a specific sequence of input signals to the semiconductor device, wherein the error component is caused by the effects of parasitic resistance; and wherein the ADC is operable to produce a numeric value based on the compounded output signal, the numeric value corresponding to the temperature of the semiconductor device.

25. The system of claim 24, wherein the semiconductor device comprises a PN-junction.

26. The system of claim 25, wherein the output signal is a base-emitter voltage developed across the PN-junction.

27. The system of claim 25, wherein the PN-junction is comprised in a diode.

28. The system of claim 25, wherein the PN-junction is comprised in a bipolar junction transistor (BJT).

29. The system of claim 24, wherein the plurality of input devices is a plurality of current sources, and the input signals are input currents.

30. The system of claim 24, wherein the plurality of input devices comprises three or more current sources and the input signals comprise input currents.

31. The system of claim 24, wherein the ADC is one of:
a pipeline ADC;
a cyclic ADC;
a delta-sigma ADC;
a successive approximation ADC; and
an integrating ADC.

* * * * *